United States Patent [19]

Mizuno et al.

[11] Patent Number: 4,546,158

[45] Date of Patent: Oct. 8, 1985

[54] VINYLIDENE FLUORIDE RESIN FIBER AND PROCESS FOR PRODUCING THE SAME

[75] Inventors: Toshiya Mizuno; Naohiro Murayama, both of Iwaki, Japan

[73] Assignee: Kureha Kagaku Kogyo Kabushiki Kaisha, Tokyo, Japan

[21] Appl. No.: 633,433

[22] Filed: Jul. 23, 1984

[30] Foreign Application Priority Data

Jul. 23, 1983 [JP] Japan ............................ 58-133590

[51] Int. Cl.$^4$ ........................ C08F 14/18; D02G 3/00; B32B 27/00

[52] U.S. Cl. ................................ 526/255; 428/364; 428/421

[58] Field of Search ...................... 428/422, 421, 364; 526/255

[56] References Cited

U.S. PATENT DOCUMENTS

| | | | |
|---|---|---|---|
| 3,553,185 | 1/1971 | Amagi et al. | 526/255 |
| 3,707,592 | 12/1972 | Ishii et al. | 526/255 |
| 3,925,339 | 12/1975 | Ishii et al. | 526/255 |
| 4,052,550 | 10/1977 | Chion et al. | 526/255 |

*Primary Examiner*—Marion E. McCamish
*Assistant Examiner*—Beverly Johnson
*Attorney, Agent, or Firm*—Wenderoth, Lind & Ponack

[57] ABSTRACT

A vinylidene fluoride resin fiber having an increased tensile strength is obtained by spinning by melt-extrusion of a vinylidene fluoride resin having a large polymerization degree under the conditions of a small extrusion rate and a large draft ratio into a small diameter of spun fiber. The thus obtained fiber is characterized by having no crystal melting point based on the vinylidene fluoride chains at a temperature below 178° C., and having a mean crystal length in the molecular chain direction of 200 A or longer and a birefringence of $30\times10^{-3}$ or larger.

6 Claims, 1 Drawing Figure

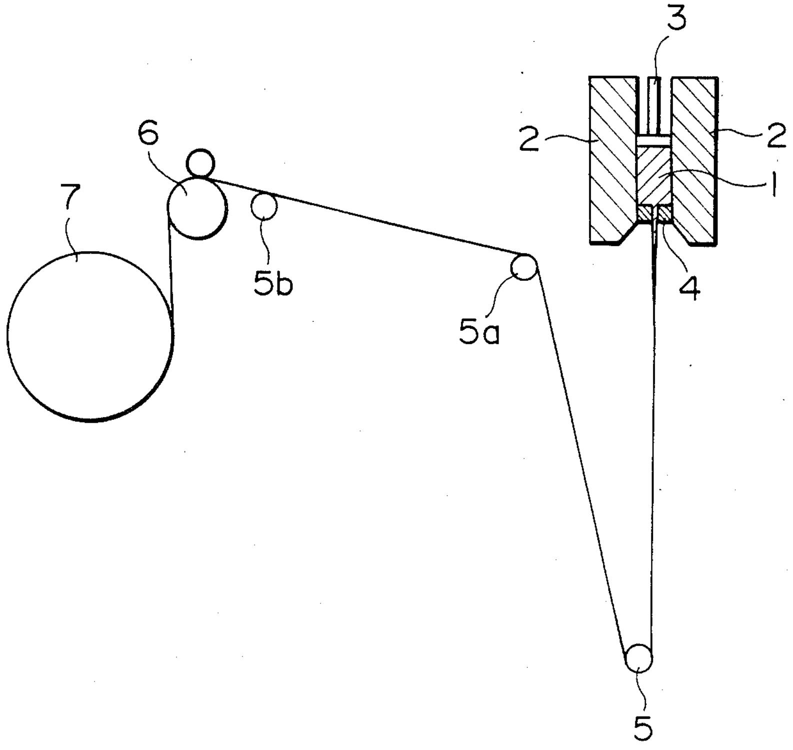
3
2
2
1
6
7
5b
4
5a
5

VINYLIDENE FLUORIDE RESIN FIBER AND PROCESS FOR PRODUCING THE SAME

BACKGROUND OF THE INVENTION

This invention relates to a vinylidene fluoride resin fiber improved in tensile strength and a process for producing the same.

Vinylidene fluoride resin fibers, due to excellent characteristics of the base resin such as weathering resistance, oil resistance, water resistance etc., are potentially suitable for a wide scope of uses requiring such characteristics, for example materials for industrial uses including ropes for industrial application, fabrics, other construction materials, materials for transportation, etc., or materials for leisure use such as fishing lines, strings for musical instruments, etc. However, the problem encountered in applying the vinylidene fluoride resin fiber for such uses as mentioned above has been its low tensile strength.

The tensile strength, for example, in ropes for industrial application, is a factor which determines how slender a rope can sustain a predetermined load, or in fabrics, is a factor which determines basically the mechanical strength, typically durability against hooking, etc.

For this reason, for vinylidene fluoride resin fibers, similarly to other resin fibers, attempts have been made to improve their tensile strength, but satisfactory results have not necessarily been obtained. For example, the basic method for improvement of tensile strength conventionally attempted for the vinylidene fluoride resin fiber has been one aiming at increasing the degree of orientation as large as possible. However, according to this method alone, even if the orientation degree may be made larger, a tensile strength of at most 80–90 $kg/mm^2$ can only be obtained. There is also an attempt to apply to vinylidene fluoride resins the ultradrawing method which is effective in obtaining high strength fibers from polyethylene or polypropylene, namely the method in which cold stretching is performed at a very slow speed to a large stretching degree of 30 to 35-times. Although this method may be successfully applied to polyethylene or polypropylene which has a small intermolecular cohesive force, no good fiber product has yet been obtained from a vinylidene fluoride resin which has a large intermolecular cohesive force. On the other hand, a high strength is obtained by spinning from a dope in liquid crystal-state of a totally aromatic polyamide resin having very rigid polymeric chains. But, it is impossible in principle to apply such a liquid crystal-state spinning method to vinylidene fluoride resins. This is because vinylidene fluoride resins are so-called flexible polymers comprising carbon-carbon single bonds, and therefore they cannot take a liquid crystal-state in a solution. Accordinly, even when spun from a solution state, they can not take a liquid crystal-state, and thus fail to give a fiber with a high strength.

SUMMARY OF THE INVENTION

A principal object of the present invention is, in view of the state of the art as described above, to provide a vinylidene fluoride resin fiber improved in tensile strength.

Another object of the invention is to provide a process for producing such a vinylidene fluoride resin fiber.

As a result of the studies with the above objects in mind, we have found that the tensile strength of the vinylidene fluoride resin fiber is related to not only the degree of orientation but also to the mean crystal length in the direction of the molecular chain and, particularly that, by increasing the mean crystal length in the molecular chain direction by melt-spinning at a high draft ratio, a vinylidene fluoride resin improved in tensile strength up to about 110 $Kg/mm^2$ can be obtained. We have and already proposed an application based thereon (Japanese Patent Application No. 150666/1982).

The present invention concerns an improvement in the above technique, and gives particularly a vinylidene fluoride resin fiber improved further in tensile strength. We have further studied with the above objects in mind and consequently have found that, in addition to the factors as described above, the crystal melting point based on the vinylidene fluoride chains in the formed fiber has a critical effect on the tensile strength of a vinylidene fluoride resin fiber. Particularly, it has been found that the fiber of a vinylidene fluoride resin designed by contrivances of the molding method to have a crystal melting point based on the vinylidene fluoride chains only at 178° C. or higher, particularly 180° C. or higher, as contrasted to the vinylidene fluoride resin obtained by the conventional forming method having a crystal melting point in the range of from 160° to 175° C., has a remarkably improved tensile strength. It has also been found that such a vinylidene fluoride resin fiber can be obtained by melt-spinning of a vinylidene fluoride resin having a relatively large molecular weight under the conditions of an extrusion rate as small as possible and a draft ratio as large as possible within the range where melt-spinning is possible, so as to make the fiber diameter obtained smaller.

The vinylidene fluoride resin fiber of the present invention is based on such a finding and, more specifically, it comprises a vinylidene fluoride resin having a number average polymerization degree of 600 or more, having no crystal melting point based on the vinylidene fluoride chains at a temperature of 178° C. or below, a mean crystal length in the molecular chain direction of 200 Å or longer and a birefrigence of $30 \times 10^{-3}$ or larger.

The process for producing the vinylidene fluoride resin fiber of the present invention comprises spinning by melt-extrusion a vinylidene fluoride resin having a number average polymerization degree of 600 or more under the conditions of an extrusion rate per nozzle of 0.005 to 0.5 g/min. and a draft ratio of 500 or larger, thereby controlling the resultant fiber diameter to 25 microns or smaller.

Thus, the vinylidene fluoride resin fiber according to the present invention naturally has a tensile strength of 120 $Kg/mm^2$ or higher, readily has a strength of 150 $Kg/mm^2$ or higher and can even have a strength of 250 $Kg/mm^2$ or higher by appropriate selection of the conditions, which is at least 2- to 3-times as large as the tensile strength of the vinylidene fluoride resin fiber of the prior art.

BRIEF DESCRIPTION OF THE DRAWING

The sole FIGURE in the accompanying drawing shows a schematic flow chart, including the longitudinal sectional view of the melt spinning device employed in the Examples.

DETAILED DESCRIPTION OF THE INVENTION

The vinylidene fluoride resin constituting the fiber of the present invention is typically homopolymer of vinylidene fluoride. In addition to the homopolymer, it is also possible to employ a copolymer containing 70 mol % or more of vinylidene fluoride and one or more comonomers copolymerizable therewith. Examples of particularly preferable comonomers are fluorine-containing olefins such as vinyl fluoride, trifluorochloroethylene, trifluoroethylene, hexafluoropropylene and the like.

Of these vinylidene fluoride resins, those having a number average polymerization degree of 600 or more are employed for the present invention. If the number average polymerization degree is less than 600, irrespective of the forming method, a fiber having a crystal melting point of 178° C. or below is obtained which does not give the desired tensile strength. A vinylidene fluoride resin having a number average polymerization degree preferably of 700 to 1800, more preferably of 800 to 1500, still more preferably of 1000 to 1300, may be employed. The vinylidene fluoride resin should have a molecular weight distribution represented by the ratio (Mw/Mn) of weight average molecular weight (Mw) to number average molecular weight (Mn), which is desirably as small as possible, preferably 10 or less, and particularly preferably 5 or less. Weight average molecular weight and number average molecular weight herein mentioned are determined by GPC (gel permeation chromatography) corrected with polystyrene as the standard substance, and the values used herein are those measured at 30° C. after dissolving 0.1 g of a vinylidene fluoride resin in 25 ml of dimethylformamide at 70° C. over 2 hours. The number average polymerization degree can be calculated from the value of the number average molecular weight measured by GPC.

The fiber of the present invention can be obtained as a shaped product of substantilly the above vinylidene fluoride resin alone or otherwise of a mixed composition containing 60 wt. % or more of the above vinylidene fluoride resin optionally mixed with, for example, plasticizers such as polyester type plasticizers, phthalic acid ester type plasticizers, etc.; nucleating agents, typically Flavantron; additives such as various organic pigments; or resins compatible with the vinylidene fluoride resins such as polymethyl methacrylate, polymethyl acrylate, methyl actrlate/isobutylene copolymer; etc.

The fiber of the present invention has a crystal melting point based on vinylidene fluoride chains only at 178° C. or above, preferably 180° C. or above. The crystal melting point here is determined as the peak position in a heat absorption curve corresponding to crystal melting on temperature elevation at a rate of 8° C./min. in a nitrogen atmosphere by means of a DSC (differential scanning calorimeter) produced by Perkin-Elmer Co.

The fiber of the present invention also has a mean crystal length in the molecular chain direction of 200 Å (angstrom) or longer, preferably 250 Å or longer. Here, the mean crystal length in the molecular chain direction is determined according to the following method.

A bundle of some tens to some hundreds of fibers is bonded and hardened with an adhesive (e.g. Allon, producd by Toa Gosei K.K.), and cut into slices in the diection perpendicular to the stretching axis of the fiber. The slices are arranged on a glass plate and fixed to provide a sample. By use of this sample, according to X-ray diffraction, the diffraction intensity obtained when the X-ray beam is incident in parallel with the stretching axis and perpendicular to the diffraction planes perpendicular to the molecular chain direction (that is, the extending direction or the stretching axis direction of the sample fiber), usually a diffraction plane with the greatest diffraction intensity among them, for example, the (002) plane in the case of α-phase crystal (form II) or the (001) plane in the case of β-phase crystal (form I), is read on the chart to determine the half-value width of the peak. On the other hand, by use of silicon single crystal powder, the mechanical expansion (namely, expansion of the diffraction peak inherent in the measuring machine) is determined. The value obtained by subtracting half-value width of the mechanical expansion from the half-value width of the measured sample is determined as the true half-value width ( $\beta w$(radian)). By use of the true half-value width, the crystal length (L) is determned from the Scherrer's equation:

$$L=(k\cdot\lambda)/(\beta w\cdot\cos\theta)$$

where $\theta$ is the Bragg reflection angle, k is a constant (=1.0) and $\lambda$ is the wavelength of X-ray $CuK_\alpha$ (1.542A) (As to details of such a measuring method, see, for example, "Basis of X-ray crystallography", tranlated by Hirabayashi and Iwasaki, Maruzen (published on Aug. 30, 1973), p. 569) The measured values described herein are those obtained by means of an X-ray diffraction device produced by Rigaku Denki K.K. at a voltage of 40 KV and a current of 20 mA, with a slit system under the conditions of a divergence slit of 1°, a receiving slit of 0.3 mm in diameter and a scattering slit of 1° and at a scanning speed of $2\theta=1$°min. The X-ray is also monochromatized with an Ni filter.

The fiber of the present invention has a birefringence of $30\times10^{-3}$ or larger, preferably $33\times10^{-3}$ or larger, particularly preferably $36\times10^{3}$ or larger. Birefringence is given by the following equation:

$$\Delta n=(n\lambda+\epsilon)/d$$

Here, the number of interference fringes n is determined from the cut end of the fiber cut under a polarizing microscope with the polarizer and the analyzer crossed with each other at right angles, using the D-line from a sodium lamp (=589 millimicron) as the light source. On the other hand, 2 is determined by Bereck's compensator from the portion corresponding to the diameter d of the fiber (see, for example, "Handbook of Fibers, Volume of Starting Materials", p. 969, Maruzen, published in November, 1968).

The fiber of the present invention may also be characterized by a feature that its amorphous portion has a density approximate to that of the crystalline portion. This has been confirmed by the X-ray small angle scattering analysis, while it is generally known that a product having a crystalline portion and an amorphous portion gives a weaker X-ray scattering intensity when the density of the amorphous portion is closer to that of the crystaline portion. More specifically, the X-ray small angle scattering analysis was conducted by using an X-ray diffraction device produced by Rigaku Denki K.K. at a voltage of 40 KV and a current of 40 mA. The X-ray was monochromatized with an Ni filter and transmitted through a slit system comprising a pair of slits each of 0.2 mm in diameter disposed in vacuum with a distance of 102 mm therebetween. The X-ray was then scattered by a sample and photographed on an X-ray sensitive film disposed 200 mm spaced apart from the sample. The exposure time was 20 hours. When the X-ray small angle scattering analysis was applied under these conditions, both conventional vinylidene fluoride resin fibers and those, disclosed in Japanese Patent Application No. 150666/1982 resulted in two-dot images on the X-ray pictures indicating the periodical and repetitive presence of crystalline phases and amorphous phases having different densities, whereas the fiber of the invention did not give such a two-dot image.

The vinylidene fluoride resin fiber of the present invention as described above can be obtained by the process of the present invention wherein the vinylidene fluoride resin satisfying the above molecular weight condition is melt-spun into a fiber under the conditions of a small extrusion rate per nozzle and a draft ratio as large as possible, whereby the fiber diameter is made smaller. More specifically, the extrusion rate during the spinning should desirably be as small as possible to obtain a higher tensile strength, provided that the other conditions, typically the draft ratio, are the same. However, too small an extrusion rate is not practical because breaking of fiber occurs due to the limit in uniformly controlling the extrusion rate and blanking period of extrusion caused thereby. Thus, the extrusion rate is generally in the range of from 0.005 g/min. to 0.5 g/min., preferably from 0.008 to 0.25 g/min., more preferably from 0.01 to 0.1 g/min. The extrusion temperature should preferably be 190° C. to 310° C. at the nozzle part. At a temperature lower than 190° C., the melt flow viscosity is too high to give an adequate fiber forming property. On the contrary, at a teperature higher than 310° C., the vinylidene fluoride resin begins to be thermally decomposed, whereby no stable spinning is possible. More preferably, the temperature range of from 210° to 290° C. is employed.

Also, both the diameter and the length of the nozzle should desirably be as small as possible for obtaining a higher tensile strength. It is generally preferred to employ a nozzle with a diameter of 1.0 mm or less and length of 0.5 to 10 mm. The vinylidene fluoride resin thus extruded is stretched to a draft ratio of at least 500 or larger, preferably 1000 or larger, more preferably 2000 or larger to give a fiber diameter as hereinafter described. The distance from the nozzle tip to the first guide roller may be determined basically as desired, but preferably within the range of from 10 to 150 cm. During this operation, the fiber may be warmed with a mantle or cooled gently with air, as desired.

However, the temperature of the guide roller should desirably be controlled at a temperature lower by at least 20° C. than the maximum crystallization temperature (namely, the temperature giving the maximum speed of crystallization), preferably at a temperature lower than the maximum crystallization temperature by 30° C. or more.

The fiber diameter after melt-spinning should be as small as possible for obtaining a high tensile strength, and it is made 25 microns or less in the process of the present invention. However, too small a diameter is inconvenient in handling, and therefor it should preferably be 3 to 20 microns, more preferably 5 to 15 microns. For making the fiber diameter smaller, in addition to increase in the draft ratio and reduction in extrusion rate as mentioned above, it is also effective to increase the extrusion temperature or make the nozzle diameter smaller.

The thus melt-spun fiber may be stored in the form of a roll thus wound up and provided for use as such, but it can further be subjected to heat treatment below the crystal melting point or cold stretching treatment before use. In particular, further improvement in tensile strength may be attained according to such a cold stretching treatment. The temperature for heat treatment or stretching may be in the range of from 100° to 180° C., preferably from 130° to 165° C. The degree of stretching may preferably be 1.05 to 1.4-times. If the stretching degree is less than 1.05-times, no appreciable difference in effect from mere heat treatment can be observed, while a stretching degree in excess of 1.4-times will give a greater risk of fiber breaking.

Further, a plurality of the thus obtained fibers after melt-spinning and winding-up can be gathered as such or after heat treatment or stretching into a bundle and subjected to twisting to be used as twisted yarn. For instance, a rope for industrial use is a typical example thereof.

As described above, according to the present invention, there are provided a vinylidene fluoride resin fiber comprising a vinylidene fluoride resin having a specific molecular weight characteristic and also a controlled average crystal length in the molecular chain direction and an double refraction index, which has a remarkably improved tensile strength as large as 2- to 3- times that of the prior art fiber, and a process for producing the same. The vinylidene fluoride fiber thus obtained is also improved in Young's modulus and is very excellent in such characteristics as weathering resistance, oil resistance, water resistance, etc., which are inherent to the base resin. Hence, it can be utilized for a wide scope of industrial materials, including materials for civil engineering and construction, materials for agriculture and fishery, materials for transportation, materials for development of oceans, etc. In addition, it can also be used suitably for materials for amusement or sports requiring high performance such as strings of musical instruments, fishlines, gut for tennis rackets, etc.

The present invention will be described in more detail by referring to the following Examples and Comparative examples.

EXAMPLE 1

By means of a melt indexer (of which a schematic illustration is shown in the FIGURE) produced by Toyo Seiki K.K., the pellet of the starting material 1 of a polyvinylidene fluoride homopolymer having a polymerization degree of 1000 and $Mw/Mn=2.2$ was extruded while being heated by a heater 2 under a pressure of a plunger 3 through a nozzle 4 having an internal diameter of 0.5 mm and a length of 1.5 mm in an extrusion rate of 0.03 g/min. at a spinning temperature of 270° C. After extrusion, the fiber was passed through a guide roller 5 set at a position about 80 cm directly below the nozzle 4, cooled in an atmosphere of 25° C. and via a pinch roller 6 wound up on a wind-up roller 7 (surface temperature: 25° C.). By using the device, the fiber could be wound up at a winding-up speed of 415 m/min (draft ratio=5100). The fiber (mono-filament) obtained had a diameter of 7 microns, an ultimate tensile strength of 250 $Kg/mm^2$, an ultimate elongation of 10%, an initial Young's modulus of 2300 $Kg/mm^2$, having very good transparency in appearance, with no coloration being observed at all. Also, by observation under a microscope, the fiber surface was found to be very smooth without any fibril-like surface roughening recognized at all.

On the other hand, the percentage of the α-phase crystal of the fiber was determined by X-ray diffraction to be 92%, while the β-phase crystal 8%, and the crystallinity (Xc) as determined from the density gradient tube method at 30° C. was 0.58. Further, the birefringence of this fiber was $36\times10^{-3}$, and the crystal melting point of the main peak determined by DSC was 181° C., with the sub-peaks being observed at 185° C. and 190° C.

EXAMPLES 2-6 AND COMPARATIVE EXAMPLES 1-4

Using the same spinning device as in Exampl e 1, spinning was performed by varying the starting materials, L/D of the nozzle, the spinning temperature, the discharging amount and the draft ratio ($R_1$). The starting material and the spinning conditions for the respective examples are listed in Table 1 and the physical properties of the fibers obtained are summarized in Table 2, respectively under the heading of Examples 2-6 and Comparative Examples 1-4.

The crystallinity and the tensile strength shown in the respective examples were measured according to the following methods, respectively.

Crystallinity

According to JIS-D1505-68, the density $\Sigma_m$ was measured in an aqueous system of water-zinc chloride at 30° C. by the density gradient tube method. On the other hand, with the α-phase crystal density, the β-phase crystal density and the amorphous density being than as 1.925 g/cc, 1.973 g/cc and 1.675 g/cc, respectively, the mixing ratio of the α-phase crystal and the β-phase crystal was determined from X-ray diffaction. The crystal density ($\rho_s$) of the sample was determined by α=1.925×(proportion of the α-phase crystal)+1.973×(proportion of β-phase crystal), and using this value ($\rho_s$), the crystallinity ($X_c$) is determined from the following equation:

$$1/\rho_m = X_c/\rho_s + \frac{(1-X_c)}{1.675}$$

The above densities of the α-phase and β-phase crystals are values shown by Tadokoro et al (Polym. J., vol. 3, pp.600, 1972), and the amorphous density of 1.675 g/cc was cited from the value shown in Vysokomol soyed Alz 1654-1661 (1970).

TABLE 1

| | Starting material | | | Spinning conditions | | | |
|---|---|---|---|---|---|---|---|
| | Number Average Polymerization Degree | $\overline{Mw}/\overline{Mn}$ | Crystal length (Å) | Nozzle L/D (mm/mmφ) | Spinning temp. (°C.) | Extrusion rate (g/min) | Draft ratio (R.) |
| Example 2 | 1000 | 2.2 | 380 | 1.5/0.5 | 266 | 0.02 | 2600 |
| Example 3 | 1000 | 2.2 | 370 | 3.0/0.5 | 280 | 0.03 | 2660 |
| Example 4 | 1000 | 2.2 | 400 | 3.0/1.0 | 282 | 0.07 | 10000 |
| Example 5 | 1100 | 2.2 | 330 | " | " | 0.03 | 7400 |
| Example 6 | 850 | 2.5 | 430 | 1.0/0.5 | 280 | 0.02 | 15625 |
| Comparative Example 1 | 1000 | 2.2 | 90 | 1.5/0.5 | 280 | 0.3 | 204 |
| Comparative Example 2 | 850 | 2.5 | 100 | 3/1.0 | 250 | 0.6 | 1110 |
| Comparative Example 3 | 1100 | 2.2 | 90 | 3/0.5 | 270 | 0.2 | 100 |
| Comparative Example 4 | 1300 | 12 | 85 | 3/1.0 | 300 | 0.2 | 280 |

TABLE 2

| | Physical properties of the fibers obtained | | | | | | | |
|---|---|---|---|---|---|---|---|---|
| | | | | | | Crystal m.p. (°C.) | | |
| | Fiber diameter (μ) | Ultimate tensile strength (kg/mm²) | Ultimate elongation (%) | Birefringence (× $10^{-3}$) | Crystallinity | Main peak | Sub-peak 1 | Sub-peak 2 |
| Example 2 | 9.8 | 190 | 22 | 43 | 0.59 | 184 | 189 | 192 |
| Example 3 | 9.7 | 150 | 20 | 40 | 0.57 | 186 | 190 | 194 |
| Example 4 | 10.0 | 170 | 18 | 42 | 0.58 | 183 | 187 | — |
| Example 5 | 11.6 | 145 | 19 | 38 | 0.57 | 185 | 190 | 193 |
| Example 6 | 4.0 | 260 | 7 | 45 | 0.58 | 188 | 192 | — |
| Comparative Example 1 | 35.0 | 80 | 35 | 33 | 0.44 | 174 | 170 | — |
| Comparative Example 2 | 30.0 | 60 | 30 | 37 | 0.45 | 173 | 170 | — |
| Comparative Example 3 | 50.0 | 70 | 35 | 35 | 0.44 | 171 | 168 | — |
| Comparative Example 4 | 60.0 | 70 | 40 | 30 | 0.38 | 165 | 159 | — |

EXAMPLE 7

The fiber obtained in Example 2 was stretched to about 18% in a silicone oil bath of 150° C. The fiber obtained had an ultimate tensile strength of 240 kg/mm² and an ultimate elongation of 6%.

Ultimate tensile strength

Tensilon (a tensile strength testing machine) was used for the measurement. A sample attached onto a paper with an inner frame length of 25 mm was fixed on Tensilon set at an effective length of 25 mm, followed by cutting of the paper, and the tensile tenacity at breakage was determined at a stretching speed of 10 mm/min. at 23° C. On the other hand, the cross-sectional area was determined from the fiber diameter measured under microscopic observation, and the ultimate strength was determined from this value and the tenacity at breakage.

What is claimed is:

1. A vinylidene fluoride resin fiber, comprising a vinylidene fluoride resin having a number average polymerization degree of 600 or more, having no crystal melting point based on the vinylidene fluoride chains at a temperature below 178° C., and having a mean crystal length in the molecular chain direction of 200 Å or longer and a birefrigence of $30\times10^{-3}$ or larger.

2. A vinylidene fluoride resin fiber according to claim 1, wherein said vinylidene fluoride resin has a ratio of weight-average molecular weight/number-average molecular weight of 10 or less.

3. A vinylidene fluoride resin fiber according to claim 1, wherein said vinylidene fluoride resin comprises homopolymer of vinylidene fluoride.

4. A vinylidene fluoride resin fiber according to claim 1, wherein said vinylidene fluoride resin comprises a copolymer of 70% or more of vinylidene fluoride and the remainder of a monomer copolymerizable with the vinylidene fluoride.

5. A vinylidene fluoride resin fiber according to claim 1, which has a diameter of 25 microns or smaller.

6. A vinylidene fluoride resin fiber according to claim 1, which has a tensile strength of 120 $Kg/mm^2$ or above.

* * * * *